July 11, 1950     S. S. THOMSON ET AL     2,515,023
SQUIRREL-CALL SOUND BOX
Filed June 4, 1947
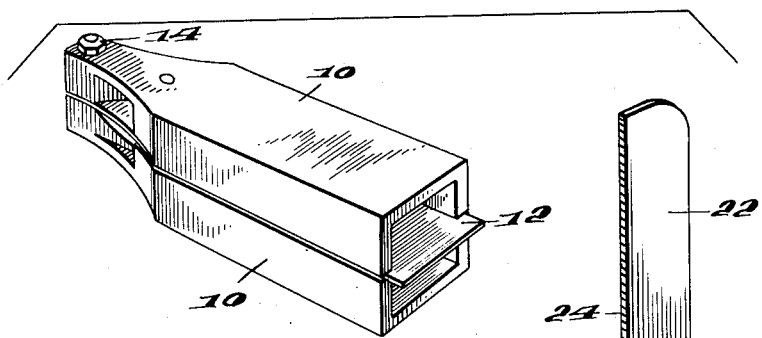
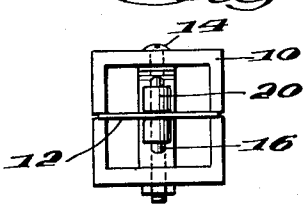
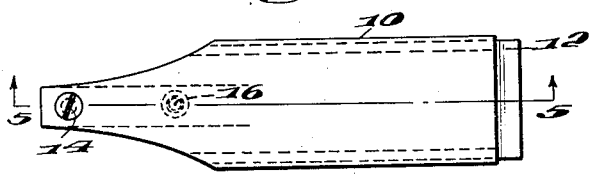
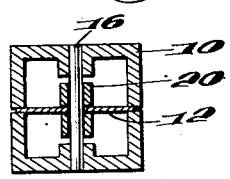
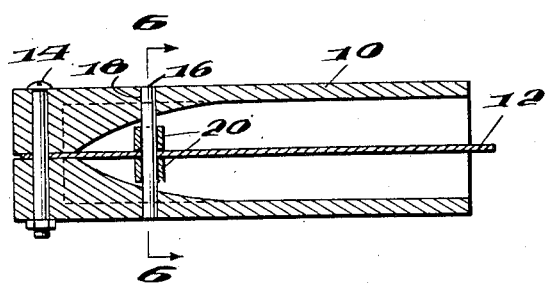
Inventor
Sidney S. Thomson
Cecil G. Hendrix
By H. Hamlin Hodges
Attorney Patented July 11, 1950

2,515,023

UNITED STATES PATENT OFFICE 2,515,023

SQUIRREL-CALL SOUND BOX

Sidney S. Thomson and Cecil A. Hendrix, Flora, Ind.

Application June 4, 1947, Serial No. 752,470

2 Claims. (Cl. 46—189)

This invention relates to a hunter's squirrel-call.

It is generally well known that hunters usually provide themselves with various types of mechanical implements for simulating the call of the animal which they are hunting at the time. Usually, such animal-calling devices are those which utilize a reed which may be vibrated by forcing air therepast, making the reed vibrate against more solid material, producing sounds which emanate therefrom. Those sounds simulate a call which would be made by an animal, such as the animal which the hunter wishes to attract during his hunting.

The primary object of our squirrel-call is to provide a call-box which when used will simulate the sound of the animal being hunted, not by air passing a reed within the sound-box, but by causing a vibration produced by means other than air.

A further object is to provide a call-box which may be easily held and manipulated in the hunter's hand, and will not necessitate his blowing therethru to create a sound simulating the sound or call made by the animal being hunted.

A further object of our invention is to provide a squirrel-call which may be readily manipulated to properly change sounds emanating therefrom, when the same is being operated.

In the accompanying drawings,

Figure 1 is a perspective view showing the squirrel-call, and a scratcher therefor;

Figure 2 is a view in side elevation;

Figure 3 is a view in end elevation;

Figure 4 is a top plan view;

Figure 5 is a vertical cross-section of a line 5—5 of Figure 4; and

Figure 6 is a vertical cross-section of the line 6—6 of Figure 5.

The squirrel-call may be made as shown in the form of a substantially square or quadrilateral shape, but the call can obviously be made in any desired general shape, such as hexagonal, octagonal, round, oval, or in any suitable tubular form. In any event, the main portion of the squirrel-call will be substantially hollow, so that sounds may be made therein to produce sounds which will simulate an animal being called by the hunter or user of the device.

Preferably, two hollow members 10 are provided which are approximately the same size. These are adapted to be held together, with their hollow surfaces facing one another. The hollow members 10 are adapted to be held together as shown in the figures, and therebetween a flat tongue 12, preferably of metal or other relatively hard material, is placed and secured between the hollow members 10 by means of a suitable bolt or rivet 14 which passes through a hole provided near one end of each of the hollow members 10. Spaced apart from the bolt 14, we provide a post 16 which preferably is made of metal or other suitable hard material. This post 16 is adapted to fit snugly within apertures 18 provided in the hollow members 10 so that the post 16 will be held frictionally in its proper position. The post 16 passes through the tongue 12 and is provided with washers 20 surrounding the post 16 and contacting the two flat surfaces of the tongue 12.

As may be seen more clearly in Figure 5, the tongue 12 is held between the two hollow members 10 forming the call-box. The bolt or rivet 14 is adapted to draw the members 10 closely together and to hold the tongue 12 therebetween. The post 16 is positioned to pass through one hollow member 10 and then a washer 20, the tongue 12, a second washer 20, and the second hollow member 10, thus securely holding the tongue 12 in its adjusted position between the two hollow members 10.

With the device thus assembled, the tongue 12 will be positioned between the sound-box hollow members 10 so that it may be securely held therebetween by the bolt 14 and may vibrate between the remaining portions of the hollow members 10.

Preferably, to create a desired amount of vibration, we provide a scratcher 22, at least one edge of which is provided with a knurled surface 24. For a matter of convenience, the scratcher 22 is provided with a hole 26 near one end thereof. The hole 26 has a diameter approximately equal to, but slightly less than, the diameter of the washers 20. The hole 26 is cut from the periphery thereof outwardly past the end of the scratcher 22 to provide a suitably enlarged opening 28. With this construction, when the scratcher is not in use, it may be placed on either surface of the tongue 12 and inserted within the sounding-box 10 formed by the two hollow members, and be forced therein until a washer 20 finds its way within the hole 26 and is frictionally held thereby. This provision is made for convenience, so that the scratcher may be held within the sound-box and be ready for use when desired.

Operation

When it is desired to call an animal being hunted, the hunter may readily remove from its position within the squirrel-call a scratcher 22 for use in scratching the tongue 12 to create its vibrations, causing simulated animal bark or "squack" to emanate from the call-box.

By holding the call-box in his hand, preferably between thumb and index finger, the scratcher 22 may be drawn on the protruding end of the tongue 12 to make the same vibrate. The operator of call-box may manipulate the remaining three fingers of the hand in which he is holding the call-box, to suitably open or close the open ends of the call-box near the bolt 14 and the rod 16. By such manipulation, suitable simulated sounds may be produced to call the hunted animal.

We claim:

1. In an animal call-box, a plurality of substantially hollow members secured together, a stiff plate positioned between the said hollow members, a post frictionally held by the said hollow members and passing therethrough and through the said stiff plate, pliable washers around the said post on either side of the said plate, and a scratcher adapted to be removably held within one of the said hollow members by either of the said washers.

2. An animal call-box including a plurality of substantially hollow portions, means securing the said hollow portions together, means including a stiff plate held between the said hollow members by the said securing means, and independent means adapted to scratch the said stiff plate and set it to vibrating, the said hollow portions being open both at the ends thereof near the said securing means and at their ends remote therefrom.

SIDNEY S. THOMSON.
CECIL A. HENDRIX.

REFERENCES CITED

The following references are of record in the file of this patent:

UNITED STATES PATENTS

| Number | Name | Date |
|--------|------|------|
| 626,827 | Draughon | June 13, 1899 |
| 651,752 | Draughon | June 12, 1900 |
| 1,341,860 | Morley | June 1, 1920 |
| 1,389,589 | Kohn | Sept. 6, 1921 |
| 2,133,440 | Fortuna | Oct. 18, 1938 |